(12) United States Patent
Han et al.

(10) Patent No.: US 8,373,751 B2
(45) Date of Patent: Feb. 12, 2013

(54) APPARATUS AND METHOD FOR MEASURING LOCATION AND DISTANCE OF OBJECT BY USING CAMERA

(75) Inventors: Kyu Bum Han, Hwaseong-si (KR); Won Tae Choi, Hwaseong-si (KR); Young Jin Cho, Seoul (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 627 days.

(21) Appl. No.: 12/588,169

(22) Filed: Oct. 6, 2009

(65) Prior Publication Data

US 2011/0025845 A1 Feb. 3, 2011

(30) Foreign Application Priority Data

Jul. 31, 2009 (KR) ........................ 10-2009-0070419

(51) Int. Cl.
*H04N 7/18* (2006.01)
(52) U.S. Cl. ......... 348/140; 348/141; 348/142; 382/201
(58) Field of Classification Search .................. 348/141, 348/142, 140; 342/52, 118, 147; 382/201
See application file for complete search history.

(56) References Cited

U.S. PATENT DOCUMENTS

| | | | | | |
|---|---|---|---|---|---|
| 5,303,205 | A | * | 4/1994 | Gauthier et al. | 367/108 |
| 5,835,641 | A | * | 11/1998 | Sotoda et al. | 382/291 |
| 6,919,917 | B1 | * | 7/2005 | Janssen | 348/143 |
| 7,176,830 | B2 | * | 2/2007 | Horibe | 342/70 |

FOREIGN PATENT DOCUMENTS

| | | |
|---|---|---|
| KR | 1998-059962 | 10/1998 |
| KR | 10-2007-0115000 | 12/2007 |
| KR | 10-2008-0010768 | 1/2008 |
| KR | 10-2009-0022486 | 3/2009 |

OTHER PUBLICATIONS

Korean Office Action mailed Jun. 10, 2011 issued in corresponding Korean Patent Application No. 10-2009-0070419.

* cited by examiner

*Primary Examiner* — Frantz Jean

(57) ABSTRACT

The present invention provides an apparatus for measuring a location and a distance of an object by using a camera including: a camera module for photographing an external image; a parameter setup unit for setting internal and external parameters of the camera module; an image processor unit for receiving a captured image of an image photographed from the camera module, extracting a target object within the captured image, and extracting specific point coordinates of the extracted target object; and a location and distance calculating unit for calculating three-dimensional object location information in a two-dimensional camera coordinate system through the internal and external parameters of the camera module and coordinates of the target object, and calculating distance information from the location information of the object.

10 Claims, 5 Drawing Sheets

REGION OF INTEREST

APPARATUS AND METHOD FOR MEASURING LOCATION AND DISTANCE OF OBJECT BY USING CAMERA

CROSS-REFERENCE TO RELATED APPLICATIONS

This application claims the benefit of Korean Patent Application No. 10-2009-0070419 filed with the Korea Intellectual Property Office on Jul. 31, 2009, the disclosure of which is incorporated herein by reference.

BACKGROUND OF THE INVENTION

1. Field of the Invention

The present invention relates to an apparatus and a method for measuring a location and a distance of an object by using a camera, more particularly, to an apparatus and a method for measuring a location and a distance of an object by using only one camera, in which specific point coordinate's of a target object are extracted from an image photographed by the camera, three-dimensional location information is calculated by using the extracted point coordinates, and then distance information is extracted from the three-dimensional location information.

2. Description of the Related Art

Recently, various industry fields have been applied technologies which can recognize a front object on a plane and catch distance information and location information of the recognized object. Especially, with the application of the technologies to automobiles, there is a tendency to develop and popularize various technologies that can sense location and distance information of an object on a front of the automobile on the move, and guide an optimal running condition to a driver.

For example, technologies for sensing location and distance information of an object may be applied to technologies for preventing front and rear collision in an intelligent automobile system. At present, the continuously developed technologies enable an automobile system to provide not only auditory sensing information, but also visual sensing information through a camera when a front object or a rear object is sensed, so that the driver can recognize the distance and location information of the object with ease.

In a conventional scheme for implementing such auditory or visual sensing information, the approximate location of a front object or a rear object is sensed through either ultrasonic waves or lasers, the sensed information is transmitted to a main controller, and then a driver acquires the transmitted information by the auditory information.

However, in this case, since the distance and location information is determined by information retro-reflected to the object, the auditory information alone is provided. Further, only simple information for determining existence or non-existence of obstacles caused by objects within a specific distance is provided. Therefore, the conventional technologies fail to meet user's demand.

In order to solve such problems, there have been provided a technology for photographing a front image or a rear image through a camera, and transferring the photographed image to a driver while providing visually sensing information of the front object or the rear object.

A scheme for providing visual sensing information through a camera has an advantage in that it can sense an external object more easily than a scheme for providing auditory sensing information, but has a disadvantage in that it is necessary to generate three-dimensional information through combination of two or more pieces of photographed information, in order to catch location information and distance information of an object through a camera. In this case, since the camera itself provides two-dimensional information, two or more cameras are used to take a photograph at the same time.

However, in a conventional scheme for providing visual sensing information by using a camera, it is necessary to use two or more cameras for extraction of three-dimensional information, and to extract location and distance information of an object by combination of an image gathered from two or more cameras. Therefore, there are disadvantages in that it is complicated to provide the information, and it is necessary to use an additional image processing device.

SUMMARY OF THE INVENTION

The present invention has been proposed in order to overcome the above-described problems and it is, therefore, an object of the present invention to provide an apparatus and a method for measuring a location and a distance of one object, in which internal and external parameters of one camera are set, specific point coordinates of an object to be measured are extracted from an image which is inputted from the camera in real time, three-dimensional location information is calculated through two-dimensional coordinate system of the camera by using the extracted point coordinates, and distance information is extracted from the three-dimensional location information.

In accordance with one aspect of the present invention to achieve the object, there is provided an apparatus for measuring a location and a distance of an object by using a camera including: a camera module for photographing an external image; a parameter setup unit for setting internal and external parameters of the camera module; an image processor unit for receiving a captured image of an image photographed from the camera module, extracting a target object within the captured image, and extracting specific point coordinates of the extracted target object; and a location and distance calculating unit for calculating three-dimensional object location information in a two-dimensional camera coordinate system through the internal and external parameters of the camera module and coordinates of the target object, and calculating distance information from the location information of the object.

The image processor unit includes an image capturing unit for instantly capturing the image photographed from the camera module, and an image processing unit configured in software or hardware so as to extract coordinates of the target object within the captured image.

The internal parameter set through the parameter setup unit is set by adjusting a length conversion variable for a pixel of the camera module and a focus distance of the camera module.

The external parameter of the parameter setup unit is set by adjusting a distance vertical to the camera module based on a known plane at which an object to be measured is located outside the camera, and a tilt angle between the known plane and the camera module.

The specific point coordinates of the target object extracted by the image processor unit are indicated by an output of vertical (y) pixel information and horizontal (x) pixel information on the two-dimensional camera coordinate system.

The target object extracted through the image processor unit is one or more in number.

The location and distance calculating unit collects the internal and external parameter setting values of the camera and real-time pixel information for coordinates of the target object of the captured image, thereby calculating three-dimensional location information by equations, $$x = \frac{X}{fx}(\cos\phi z - \sin\phi h), \text{ and}$$

$$z = \frac{fy + \tan\phi Y}{Y - fy\tan\phi}h.$$

The location and distance calculating unit extracts distance information from the three-dimensional location information, through an equation, $$P = \sqrt{x^2 + y^2 + z^2}.$$

In accordance with still another aspect of the present invention to achieve the object, there is provided a method for measuring a distance and a location of an object by using a camera including the steps of: setting internal and external parameters of a camera module; extracting an object target from an image inputted from the camera module, and extracting pixel information of specific point coordinates by a two-dimensional camera coordinate system from the extracted target object; calculating three-dimensional location information of the target object through and the parameter information and the specific point coordinates of the target object; and calculating distance information of the target object by using the calculated three-dimensional location information of the target object.

The method further including a step of capturing an instant image of the object to be measured among images through the image capturing unit, and setting the target object, before the step of extracting pixel information of the specific point coordinates.

The internal parameters may be defined by a product of vertical or horizontal direction transformation factors (ax, ay) for a focus distance (f), and the external parameter may be defined by a vertical distance between the camera module and the known plane where an object to be measured is located, and a tilt angle between the camera coordinate system and the known plane.

In the step of calculating three-dimensional location information of the object, when the location information of the target object is set to have vertical coordinates, x directional location and z directional location may be calculated by equations, $$x = \frac{X}{fx}(\cos\phi z - \sin\phi h)$$

$$z = \frac{fy + \tan\phi Y}{Y - fy\tan\phi}h.$$

The distance information P may be calculated through a following equation, by using the three-location information of x, y, z directions through the equations, $$P = \sqrt{x^2 + y^2 + z^2}.$$

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIGS. 3 to 6A and 6B are views showing a process in which a location and a distance are measured through the apparatus for measuring a location and a distance in accordance with an embodiment of the present invention.

DETAILED DESCRIPTION OF THE PREFERABLE EMBODIMENTS

Figure 1:
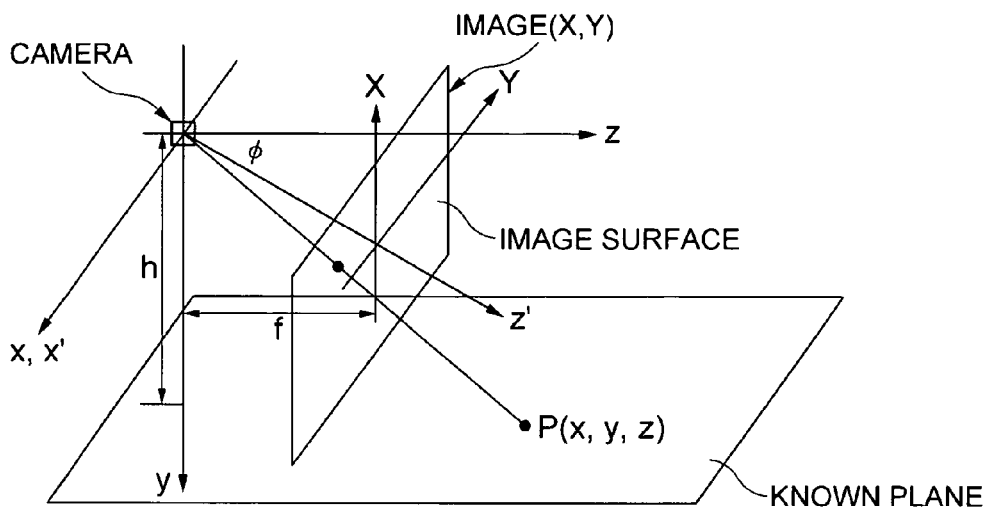
FIG. 1 is a view showing a relation between a camera coordinate system and image coordinates in an apparatus for measuring a location and a distance in accordance with an embodiment of the present invention.

Embodiments of a method for measuring a location and a distance of an object in accordance with the present invention will be described in detail with reference to the accompanying drawings. When describing them with reference to the drawings, the same or corresponding component is represented by the same reference numeral and repeated description thereof will be omitted.

Figure 2:
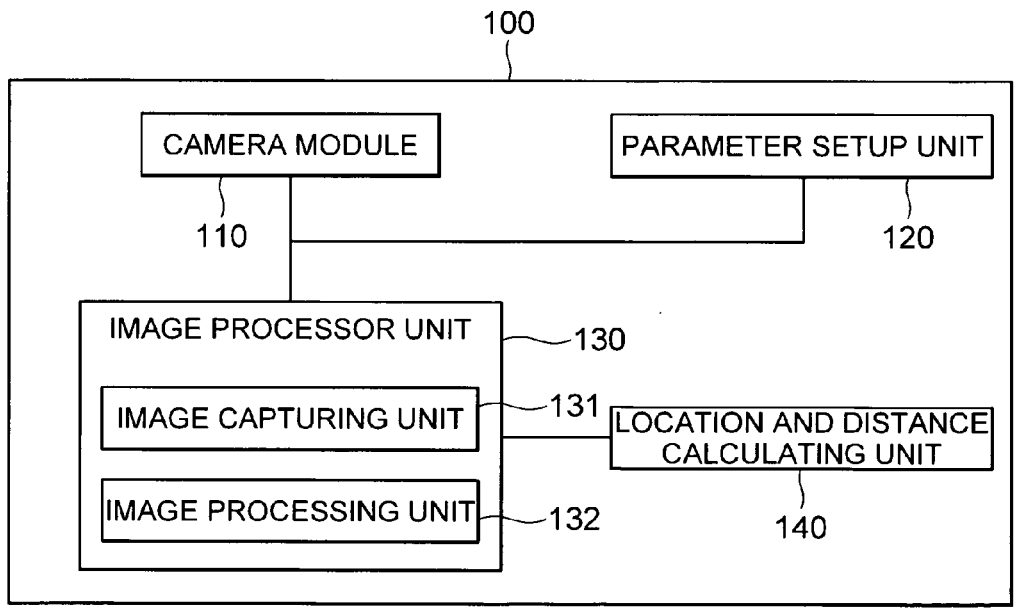
FIG. 2 is a block diagram showing an apparatus for measuring a location and a distance in accordance with an embodiment of the present invention.

First, FIG. 1 is a view showing a relation between a camera coordinate system and image coordinates in an apparatus for measuring a location and a distance in accordance with an embodiment of the present invention. FIG. 2 is a block diagram showing an apparatus for measuring a location and a distance in accordance with an embodiment of the present invention.

Hereinafter, the embodiment of the present invention will be described under the assumption that a camera of being a main component is fixedly positioned, and a desired object to be sensed through the camera exists on a known plane.

For more clear understanding of the embodiment of the present invention, a camera mounted on an automobile, and a front object photographed through the camera considered as a target object will be described.

As shown in FIG. 2, the apparatus for measuring the location and the distance 100 in accordance with the embodiment of the present invention includes a camera module 110, a parameter setup unit 120 for setting a location relation of the camera module 110 and an internal photography condition, an image processor unit 130 for extracting specific point coordinates of a target object P from an image photographed by the camera module 110, and a location and distance calculating unit 140 for extracting location information and distance information of the target object P through the specific point coordinates.

The camera module 110 is installed at an arbitrary spot, including the front of the automobile, or the rear of the automobile, to photograph a front image or a rear image. The camera module 110 also converts the photographed image into an image signal through an image sensor (not shown).

The camera module 110 provides images photographed in the image sensor of a CMOS or a CCD, and provides an image from the image signal converted by the image sensor according to a communication scheme, such as an NTCS, a PAL, and so on.

In this case, the parameter setup unit 120 sets internal and external photography conditions of the camera module, so that the image photographed through the camera module 110 can be provided to be suitable for the processing unit 130.

The parameter setup unit 120 sets internal and external parameters of the camera module 110, and has the set parameters stored therein. Herein, the set parameters include not only an installment location of the camera module, but also detailed parameters which may be set through a user interface.

The internal parameter may be set by adjustment of length conversion variables (ax, ay) for a focus distance (f) of the camera module 110 and a pixel of the camera module 110, so fx, and fy corresponding to pixels can be defined as a value, obtained by multiplying ax and ay of being direction transformation factors of x axis and y axis together the focus distance (f). That is, the internal parameter is set by correction of fx and fy, in order to perform a calibration process of the camera module.

Further, when the camera module 110 is mounted at a predetermined height of a mounted target (automobile), the external parameter includes a vertical distance (h) between the camera module 110 and the known plane, and a tilt angle (φ) formed between the camera module 110 and a plane inclined to the known plane. Since the camera module 110 is mostly fixedly installed, the tilt angle (φ) with respect to the known plane which is changeable at the time of image photography may be set as a variable.

Herein, a camera coordinate system for extracting coordinates of the target object P from an image photographed by the camera module 110 includes an x axis, a y axis, and a z axis. Herein, the z axis is made by defining a coordinate axis vertical to a camera image plane, and the x axis is made by defining an axis vertical to the z axis based on a camera center point as 0 in a two-dimensional coordinate system, and the y axis is made by defining a remaining vertical axis.

In this case, when the camera module 110 is tilted, an x axis is coincident to x', resulting from the rotary transformation of the x axis in the camera coordinate system, before and after rotation of the camera coordinate system, which is expressed as x=x'.

Meanwhile, the image processor unit 130 extracts the target object P by combination of the image information and the parameter information, and coordinates for the target object P (i.e. coordinates of the specific point on the two-dimensional camera coordinate system). Herein, the image information is photographed through the camera module 110, and the parameter information is set through the parameter setup unit 120.

To this end, the image processor unit 130 includes an image capturing unit 131 for instantly capturing the image transmitted through the camera module 110 in real time, and an image processing unit 132 for extracting the target object P and the coordinates from the captured image through separate software or separate hardware.

In this case, the image processor unit 130 can extract at least one target object from the image photographed by the camera module 110. A description will be given of an example of a scheme for extracting the target object P and the coordinates of the target object P.

Figure 3:
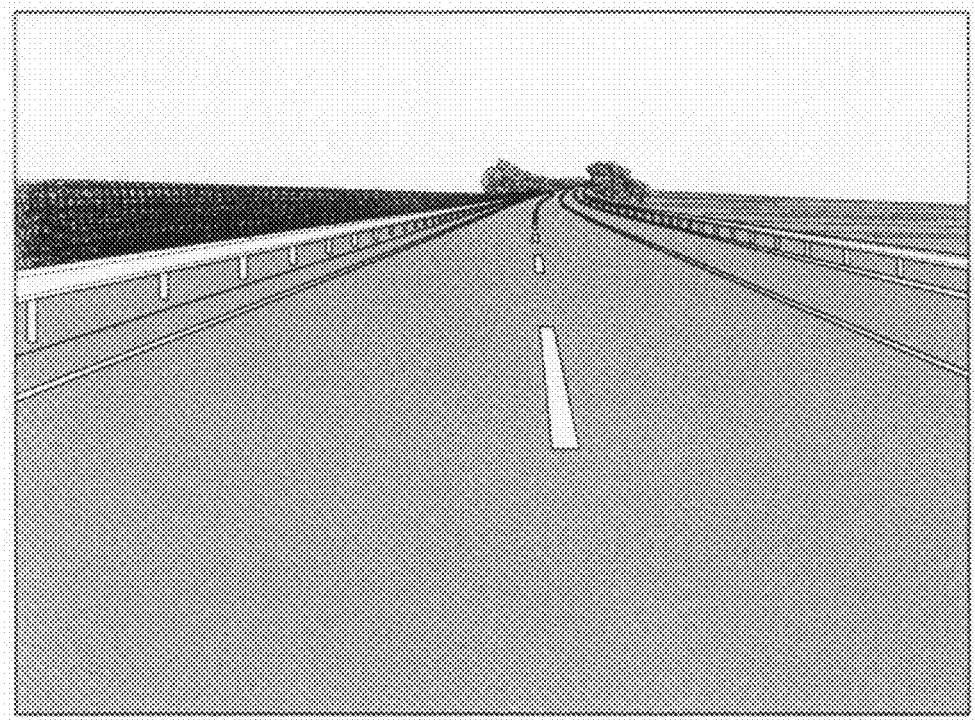

First, when it is assumed that there is an image photographed through a camera mounted at an arbitrary spot in front of the automobile on the move, as shown in FIG. 3, the image is transferred to the image processor unit 130 through the camera module, and then the transferred image is captured through the image capturing unit 131.

The image processing unit 132 extracts the captured image from a background based on a desired object to be measured as the target object P, and extracts coordinates of the extracted target object P according to a software scheme or a hardware scheme.

In the present embodiment, it is possible to set a specific point for a desired target object P, which is to be extracted, on the image photographed on the basis of a running lane positioned at the center, and to set the target object P because of presence of the target object on the known plane as a running surface.

Figure 4:
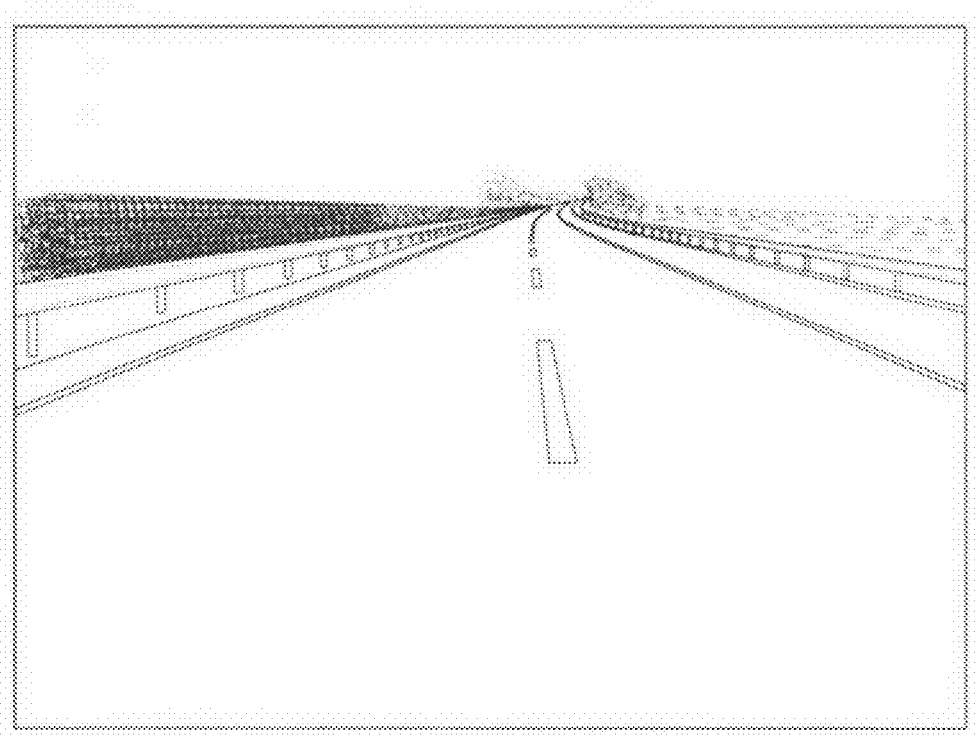
Figure 5:
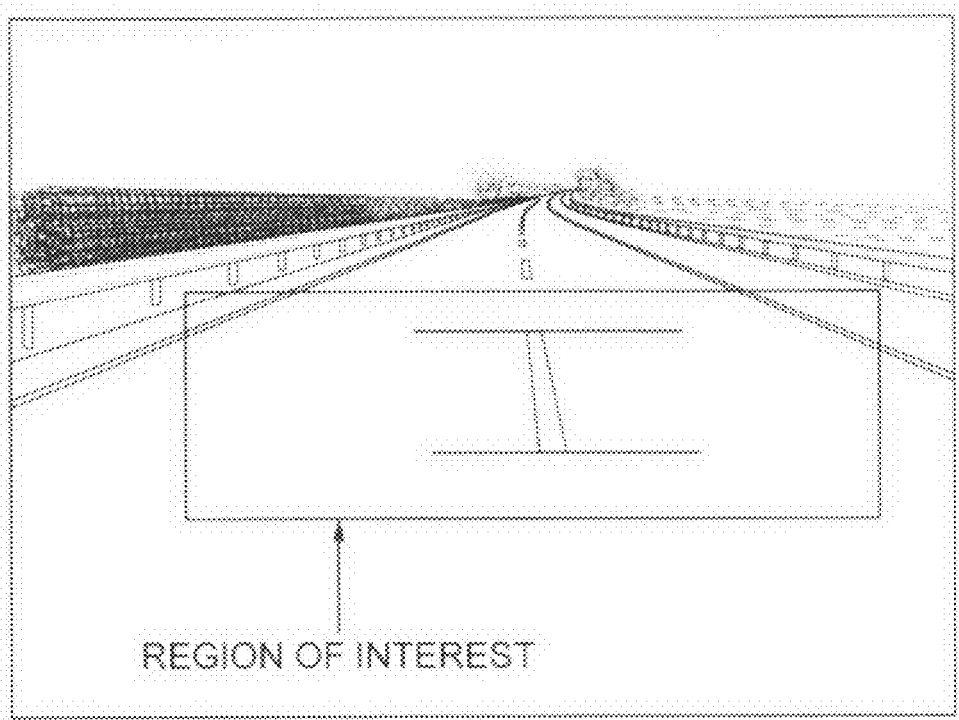

The target object P can be extracted by an edge extraction (shown in FIG. 4), a feature extraction (shown in FIG. 5) for setting a specific region for the entire image as a region of interest (ROI), and so on. In the base of the edge extraction shown in FIG. 4, the edge extraction may be implemented in various manners, by using a sobel filter, a canny filter, a prewitt filter, and, so on. The feature extraction shown in FIG. 5 may define features as linear components existing within images through a Hough transform scheme.

Figure 6A:
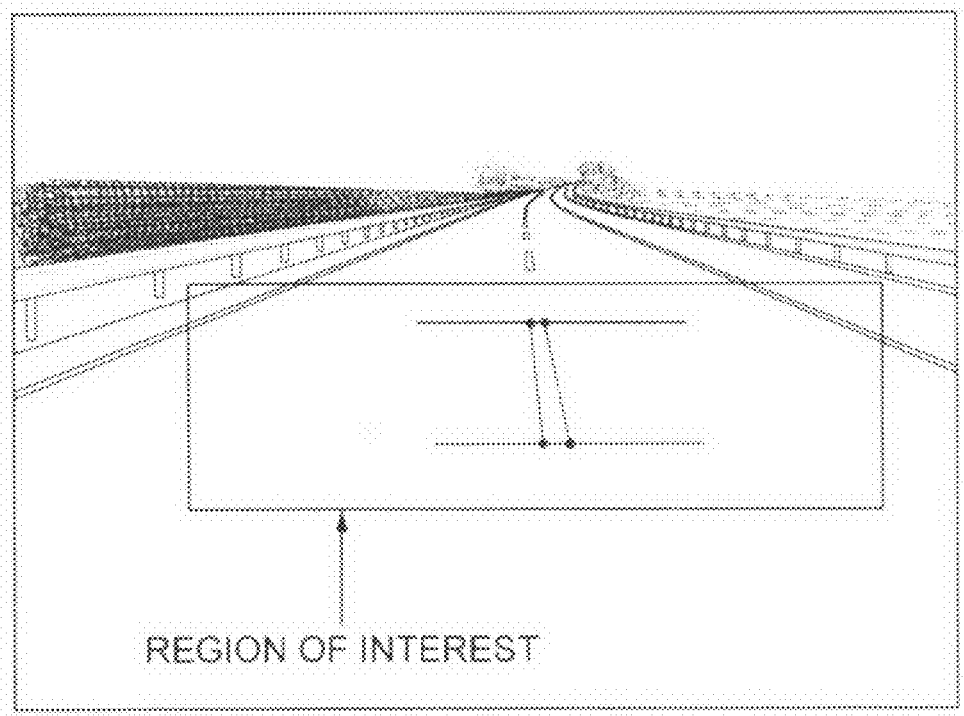

Meanwhile, when the target object P is defined within a line of a region of interest, the target object P within the region of interest can be extracted as shown in FIG. 6A, through four apexes of the running lane, finally obtained by reducing the running lane surface of the rectangular running lane included in the linear component to four apexes.

Figure 6B:
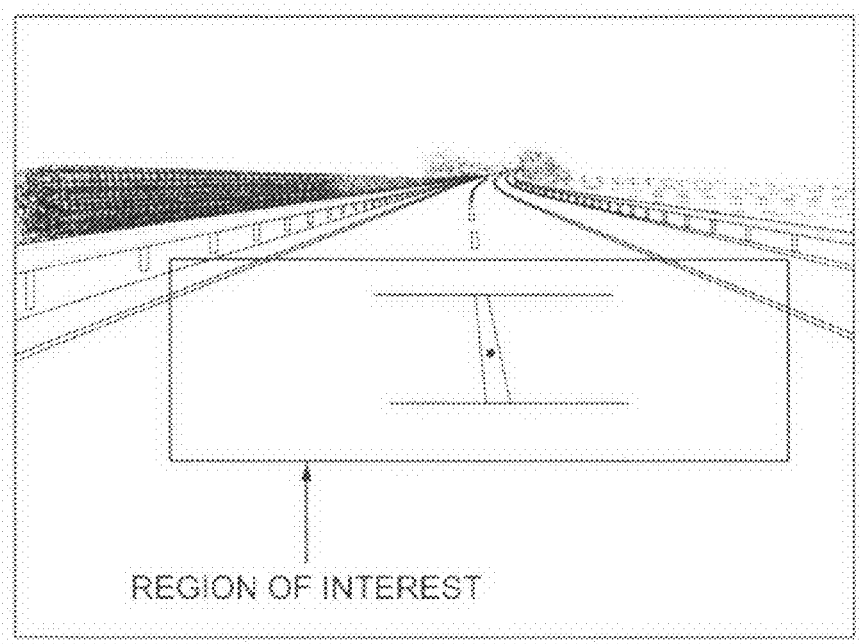

Further, it is possible to set the target object P through the central point of the running lane surface as well while narrowing the boundary of the running lane surface as shown in FIG. 6B.

After the target object P is extracted, coordinates of the target object P is extracted in the unit of a pixel on the plane within the image.

As shown in FIG. 6A, when the target object P, that is, the target object obtained through four apexes of the running lane, is extracted, coordinates of the running lane may be outputted in the form of (X1, Y1), (X2, Y2), (X3, Y3), and (X4, Y4) as coordinates of running lane, through two-dimensional camera coordinate system, on the plane within an image for four apexes of the running lane.

In this case, since only coordinates of the central point of the target object P is extracted if the target object P is as in the case of FIG. 6B, the central point of the running lane may be outputted in the form of (X1, Y1), through two-dimensional camera coordinate system, on the plane within the image.

The outputted target object P and the coordinates of the target object P on the plane is provided to the location and distance calculating unit 140 so that the location and distance of the target object P can be finally extracted.

The location and distance calculating unit 140 calculates three-dimensional location and distance information of a corresponding target object P by combination and calculation of location coordinates of two-dimensional camera coordinate system of the target object P extracted through the image processor unit 130 and internal and external parameters corresponding to setting values associated with installment of the camera module 110.

x, y, z, which are coordinates representing where the target object P is located in three dimension, can be calculated by following Equations 1 and 2, based on the condition of y=h, wherein h as being a height vertical to the known plane is fixed according to the installment condition of the camera module 110 as shown in FIG. 2.

$$x = \frac{X}{fx}(\cos\phi z - \sin\phi h) \qquad \text{Equation 1}$$

$$z = \frac{fy + \tan\phi Y}{Y - fy\tan\phi} h \qquad \text{Equation 2}$$

Also, the distance information of the target object P can be calculated by a following Equation 3, by applying the Pythagorean theorem to the three-dimensional information (x, y, z) of the target object P.

$$P=\sqrt{x^2+y^2+z^2}. \qquad \text{Equation 3}$$

Meanwhile, a detailed description will be given of solutions for the equations, when a method for measuring location and distance is described with reference to the drawings below.

Figure 7:
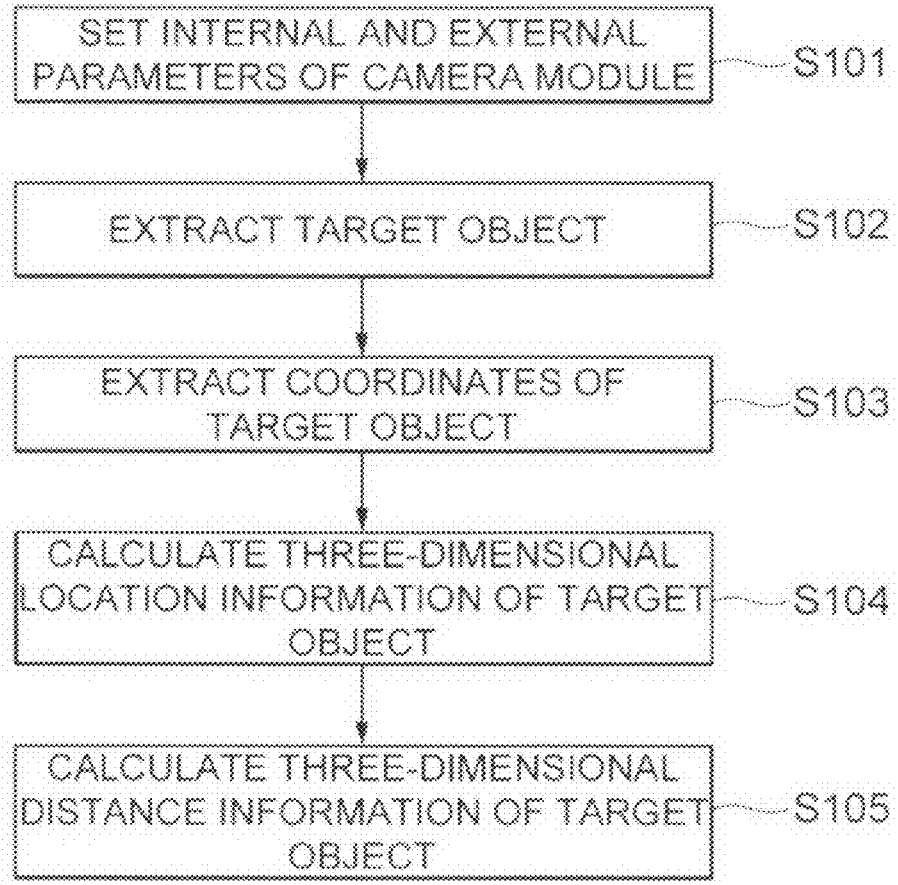
FIG. 7 is a flowchart showing a method for measuring a location and a distance by using a camera in accordance with an embodiment of the present invention.

FIG. 7 is a flowchart showing a method for measuring a location and a distance of an object by using a camera in accordance with an embodiment of the present invention. As shown in FIG. 7, in the method for measuring the location and distance of the object, the camera module 110 is installed at an arbitrary spot in the front or rear of the automobile, and internal and external parameters of the camera module 110 are set (step S101).

The internal and external parameters set in the camera module 110 are stored in the parameter setup unit 120, and the camera module having the parameters stored therein photographs an external image. Then, the photographed image is transmitted to the image processor unit 130, and then the target object is extracted (step S102) and specific point coordinates of the target object P are extracted (step S103).

Next, three-dimensional location information of the target object is calculated based on Equation 1 and 2, by using the specific point coordinates of the target object P and parameter information (step S104).

Further, distance information of the target object P is calculated by using the calculated three-dimensional location information (x, y, z) of the target object (step S105).

In this case, the method for measuring the location and distance of the object may further include a step for setting the target object P through an edge extraction scheme, or a feature extraction scheme simultaneously while capturing instantly the image transmitted to the image processor unit 130.

Further, the method for measuring the location and distance information may further include a step for setting coordinates of a corresponding target object P based on any specific point of the target object P, for example, outermost apexes, central points, or the like.

Meanwhile, Equations 1 to 3 for calculation of the location information and distance information of the target object P are as follows.

First, in Equations 1 to 3, the camera coordinate system in which the center of the camera module is the origin (0) is denoted by x, y, z, and rotary converted coordinate system by a tilt angle is denoted by x', y', z' when the tilt angle (φ) between the camera module and the known plane is formed, which satisfies a following equation (1) by homogeneous transform.

$$\begin{bmatrix} x' \\ y' \\ z' \end{bmatrix} = \begin{bmatrix} 1 & 0 & 0 \\ 0 & \cos\phi & \sin\phi \\ 0 & -\sin\phi & \cos\phi \end{bmatrix} \begin{bmatrix} x \\ y \\ z \end{bmatrix} \qquad (1)$$

Rotary converted x', y', z' calculated through equation (1) are as follows.

x'=x y'=cos φy+sin φz z'=−sin φy+cos φz    (2)

Meanwhile, when pixel coordinates of the target object is defined as x, y on the captured image, a following equation can be obtained in projection geometry.

$$X = fx \times \frac{x'}{z'} \qquad (3)$$
$$Y = fy \times \frac{y'}{z'}$$

z', y' in equation (2) is substituted into z', y' in the equation (3), and the condition of y=h is applied under the assumption that the target object P exists on the known plane, which is defined by equation (4) below.

$$Y = fy \frac{\cos\phi h + \sin\phi z}{-\sin\phi h + \cos\phi z} \qquad (4)$$

Expression for z is given as follows.

$$z = \frac{fy + \tan\phi Y}{Y - fy\tan\varphi} h \qquad (5)$$

From equation (5), z coordinate information of three-dimensional location information of the object can be obtained. Next, referring to X function in equation (3), X is expressed as equation (6) below.

$$X = fx \times \frac{x'}{z'} \qquad (6)$$

Expression of x is given as equation (7) below by applying equations (1) to (5), as in a case of z coordinates.

$$x = \frac{X}{fx}(\cos\phi z - \sin\phi h) \qquad (7)$$

From equation (7), x coordinate information of three-dimensional location information of the object can be calculated. Since y is equivalent to h in the applied conditions, three-dimensional location information can be calculated by coordinates of x, y, z of the target object P. Further, the three-dimensional distance information can be calculated through a following equation using Pythagorean theorem, by collecting three-dimensional location information.

$$P=\sqrt{x^2+y^2+z^2} \qquad (8)$$

In a method for measuring a location and a distance of an object in accordance with an embodiment of the present invention, three-dimensional location and distance information is calculated through two-dimensional coordinates of an sensed object extracted from an image photographed from only one camera, so that functions of at least two cameras can be performed even through only the camera. Therefore, it is possible to reduce manufacturing costs of the apparatus for sensing a location and a distance. Further, it is possible to obtain real-time information and to provide not only obtaining information for a plurality of objects, but also generic information, by calculating a location and a distance in separate hardware or in separate software.

Also, in an apparatus for measuring a location and a distance in accordance with an embodiment of the present invention, a conventional sensing system based on various sensors can be substituted with a visual sensing system capable of outputting an image. When the apparatus is mounted on an automobile, a system for providing running information in a variety of forms can be implemented to be intelligent and visualized. Further, the apparatus generally provides monitoring information by using a camera, so that a variety of functional factors can be integrated.

As described above, although the preferable embodiments of the present invention have been shown and described, it will be appreciated by those skilled in the art that substitutions, modifications and variations may be made in these embodiments without departing from the principles and spirit of the general inventive concept, the scope of which is defined in the appended claims and their equivalents.

What is claimed is:

1. An apparatus for measuring a location and a distance of an object by using a camera comprising:
    a camera module for photographing an external image;
    a parameter setup unit for setting internal and external parameters of the camera module;
    an image processor unit for receiving a captured image of an image photographed from the camera module, extracting a target object within the captured image, and extracting specific point coordinates of the extracted target object; and
    a location and distance calculating unit for calculating three-dimensional object location information from a two-dimensional camera coordinate system through the internal and external parameters of the camera module and the specific point coordinates of the target object extracted by the image processor unit, and calculating distance information from the three-dimensional object location information of the object.

2. The apparatus of claim 1, wherein the image processor unit includes an image capturing unit for instantly capturing the image photographed from the camera module, and an image processing unit configured in software or hardware so as to extract coordinates of the target object within the captured image.

3. The apparatus of claim 1, wherein an internal parameter set through the parameter setup unit is set by adjusting a length conversion variable for a pixel of the camera module and a focus distance of the camera module.

4. The apparatus of claim 1, wherein the external parameter of the parameter setup unit is set by adjusting a distance vertical to the camera module based on a known plane at which an object to be measured is located outside the camera, and a tilt angle between the known plane and the camera module.

5. The apparatus of claim 1, wherein the specific point coordinates of the target object extracted by the image processor unit are indicated by an output of vertical (y) pixel information and horizontal (x) pixel information on the two-dimensional camera coordinate system.

6. The apparatus of claim 1, wherein the target object extracted through the image processor unit is one or more in number.

7. The apparatus of claim 1, wherein the location and distance calculating unit collects the internal and external parameter setting values of the camera and real-time pixel information for coordinates of the target object of the captured image, thereby calculating three-dimensional location information by equations, $$x = \frac{X}{fx}(\cos\phi z - \sin\phi h), \text{ and}$$

$$z = \frac{fy + \tan\phi Y}{Y - fy\tan\phi}h.$$

8. The apparatus of claim 7, wherein the location and distance calculating unit extracts distance information from the three-dimensional location information, through an equation, $$P = \sqrt{x^2 + y^2 + z^2}.$$

9. A method for measuring a distance and a location of an object by using a camera comprising:
    setting internal and external parameters of a camera module;
    extracting target object from an image inputted from the camera module, and extracting pixel information of specific point coordinates by a two-dimensional camera coordinate system from the extracted target object;
    calculating three-dimensional location information of the target object through the parameter information and the specific point coordinates of the target object; and
    calculating distance information of the target object by using the calculated three-dimensional location information of the target object.

10. The method of claim 9, further comprising capturing an instant image of the object to be measured among images through the image capturing unit, and setting the target object, before extracting pixel information of the specific point coordinates.

* * * * *

UNITED STATES PATENT AND TRADEMARK OFFICE
CERTIFICATE OF CORRECTION

PATENT NO. : 8,373,751 B2
APPLICATION NO. : 12/588169
DATED : February 12, 2013
INVENTOR(S) : Kyu Bum Han et al.

Page 1 of 1

It is certified that error appears in the above-identified patent and that said Letters Patent is hereby corrected as shown below:

In the Claims

Column 10, Line 34, delete "extracting" and insert -- extracting a --, therefor.

Signed and Sealed this
Eleventh Day of June, 2013

Teresa Stanek Rea
*Acting Director of the United States Patent and Trademark Office*